(12) United States Patent
Tao et al.

(10) Patent No.: US 10,178,457 B1
(45) Date of Patent: Jan. 8, 2019

(54) AUDIO OUTPUT ASSEMBLY FOR A HEAD-MOUNTED DISPLAY

(71) Applicant: Facebook Technologies, LLC, Menlo Park, CA (US)

(72) Inventors: David Tao, Santa Clara, CA (US); Clare Regimbal Long, Edmonds, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/668,610

(22) Filed: Aug. 3, 2017

(51) Int. Cl.
| *H04R 1/02* | (2006.01) |
|---|---|
| *H04R 9/06* | (2006.01) |
| *H04R 1/34* | (2006.01) |

(52) U.S. Cl.
CPC ............. *H04R 1/028* (2013.01); *H04R 1/345* (2013.01); *H04R 2499/15* (2013.01)

(58) Field of Classification Search
CPC .............................. H04R 1/028; H04R 1/345
See application file for complete search history.

(56) References Cited

U.S. PATENT DOCUMENTS

| 2005/0096096 A1* | 5/2005 | Birli | H04B 1/385 455/569.1 |
|---|---|---|---|
| 2014/0098009 A1 | 4/2014 | Prest et al. | |
| 2015/0237430 A1 | 8/2015 | Han et al. | |
| 2017/0195775 A1* | 7/2017 | Morris | H04R 1/1066 |

FOREIGN PATENT DOCUMENTS

| JP | 11-331730 A | 11/1999 |
|---|---|---|
| JP | 2013-093808 A | 5/2003 |

OTHER PUBLICATIONS

PCT International Search Report and Written Opinion, PCT/US2017/052558, dated Feb. 26, 2018, 11 pages.

* cited by examiner

*Primary Examiner* — Simon King
(74) *Attorney, Agent, or Firm* — Fenwick & West LLP (57) ABSTRACT

A head-mounted display (HMD) includes a housing defining an enclosure having an aperture. A is speaker positioned within the enclosure, the speaker having a back side facing an interior surface of the housing and a front side facing away from the interior surface of the housing, a back volume defined between at least a portion of the housing and the back side of the speaker for enhancing sound generated by the speaker. A sound conduit having an end open to the enclosure and extends outside the housing through the aperture. The sound conduit has another end open toward a rear direction to transmit the sound generated by the speaker.

20 Claims, 8 Drawing Sheets

AUDIO OUTPUT ASSEMBLY FOR A HEAD-MOUNTED DISPLAY

BACKGROUND

The present disclosure relates to audio output in a head-mounted display (HMD).

The HMD can operate as part of, e.g., a virtual reality (VR) system, an augmented reality (AR) system, a mixed reality (MR) system, or some combination thereof. During operations of the HMD, the HMD is worn on a user's head and an audio output may be presented in connection with a video output. However, generating a high quality audio output directly from an HMD can be difficult. The housing size of the HMD may be limited to comfortably fit on the user's head. The housing, for example, may include with a front rigid body that holds a display panel and other electronic components. When the HMD is worn by the user, the front rigid body is positioned in front of the user's eyes, and thus separated by a distance from the user's ears. As such, conventional HMD systems have used separate headphones or other audio output devices for audio output instead of audio components integrated within the front rigid body, or other portion of the HMD housing.

SUMMARY

Embodiments of the present disclosure relate to a head-mounted display (HMD) that includes a back volume defined by a portion of a housing and a back side of a speaker. The housing of the HMD defines an enclosure having an aperture. The speaker positioned within the enclosure and the back side of the speaker faces an interior surface of the housing. A front side of the speaker faces away from the interior surface of the housing. The back volume is defined between at least the housing and the back side of the speaker for enhancing sound generated by the speaker. A sound conduit having an end open to the enclosure and extends outside the housing through the aperture. The sound conduit has another end open toward a rear direction to transmit the sound generated by the speaker.

BRIEF DESCRIPTION OF THE DRAWINGS

The figures depict embodiments of the present disclosure for purposes of illustration only.

DETAILED DESCRIPTION

Embodiments of the present disclosure relate to a head-mounted display (HMD) with integrated audio output assemblies for high quality audio output. For each of left and right audio outputs, the HMD includes a housing that defines an enclosure having an aperture. The housing may be a portion of a front rigid body of the HMD where components, including one or more display panels, are mounted. A speaker is positioned in the enclosure to define a back volume defined between at least a portion of the housing and the back side of the speaker for enhancing sound generated by the speaker. A sound conduit extends through the aperture to transmit sound from the speaker within the enclosure in a rear direction toward an ear of a user wearing the HMD.

Figure 1:
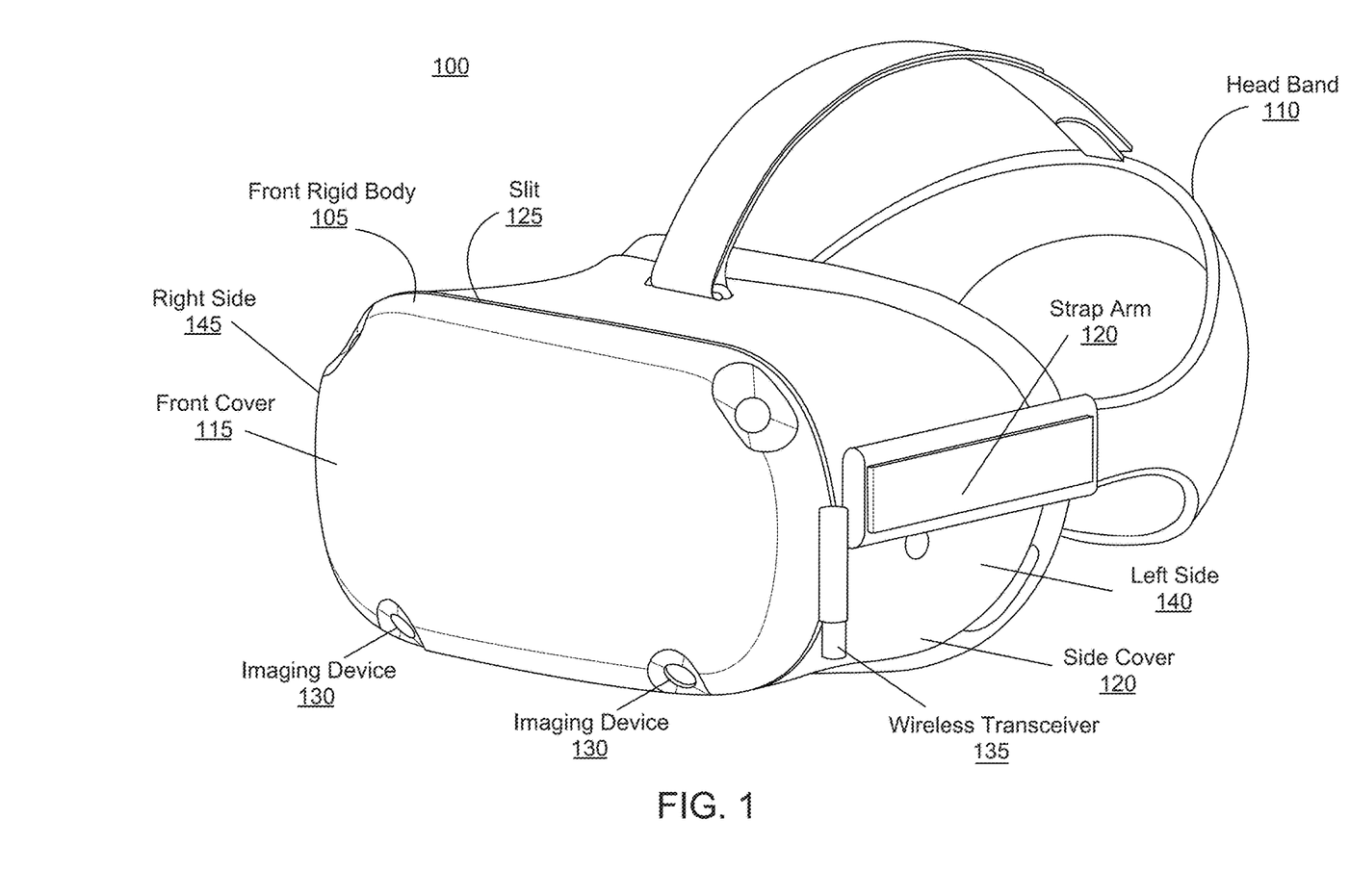
FIG. 1 is a perspective view of a head-mounted display (HMD), in accordance with an embodiment.

FIG. 1 is a perspective view of HMD 100, in accordance with an embodiment. The HMD 100 may be part of a virtual reality (VR) system, an augmented reality (AR) system, a mixed reality (MR) system, or some combination thereof. The HMD 100 may include, among other components, a front rigid body 105, a head strap 110, a front cover 115, and a side cover 120. The side cover 120 encloses a housing including an audio output assembly at the left side 140 and right side 145 of the front rigid body 105 for providing audio output of the HMD 100. The audio output assembly is discussed below in detail in conjunction with FIGS. 2A, 2B, 3, 4, 5, 6, and 7. The front cover 115 is attached to the side cover 120 with a slit 125 between an outer edge of the front cover 115 and an outer edge of the side cover 120 to discharge air and heat out of the HMD 100.

Figure 2A:
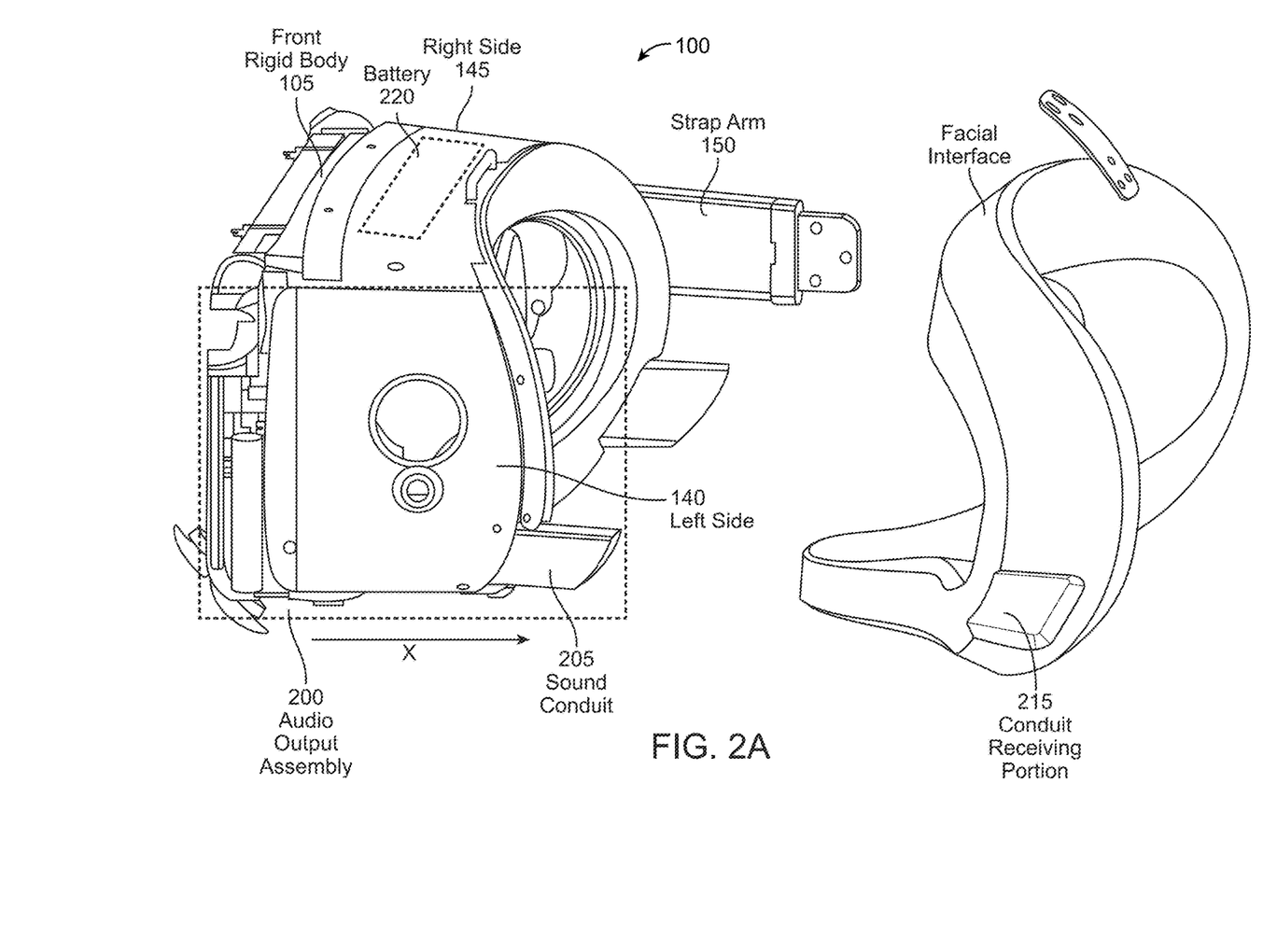
FIG. 2A is a side view of the HMD in FIG. 1 without the side cover 120, in accordance with one embodiment.

The audio output assemblies at the left side 140 and the right side 145 of the front rigid body 105 are each attached to a strap arm, such as the strap arm 120 at the left side 140 and a strap arm 150 (shown in FIG. 2) at the right side 145. The strap arms 120 and 150 secure the head strap 110 to the front rigid body 105, and may provide adjustable attachments for the head strap 110 to accommodate different head sizes.

The HMD 100 shown in FIG. 1 also includes camera assemblies 130 located on top and bottom portions of the front cover 115. In some embodiments, each camera assembly 130 can be implemented as a depth camera assembly (DCA) that determines depth information of a local area surrounding some or all of the HMD 100. Each camera assembly 130 includes an imaging aperture and an illumination aperture (not shown in FIG. 1), and an illumination source (not shown in FIG. 1) of the camera assembly 130 emits light through the illumination aperture. The illumination source of the camera assembly 130 may be composed of a plurality of laser-type light emitters on a single substrate that simultaneously or in different time instants emit a plurality of light beams, e.g., in the form of a structured light pattern. An imaging device (not shown in FIG. 1) of the camera assembly 130 captures light from the illumination source that is reflected and/or scattered from the local area through the imaging aperture. A controller (not shown in FIG. 1) coupled to the imaging device or integrated within the imaging device of the camera assembly 130 may determine two-dimensional or three-dimensional information of one or more objects in the local area based on the captured reflected/scattered light. The same or a separate controller can control operation of the illumination source of the camera assembly 130.

The HMD 100 shown in FIG. 1 also includes a wireless transceiver 135. In some embodiments, the HMD 100 wirelessly communicates with a console (not shown in FIG. 1) via the wireless transceiver 135. The console may provide content to the HMD 100 for processing in accordance with information received from the HMD 100. The HMD 100 may transmit the information to the console via the wireless transceiver 135. The HMD may further receive the content from the console via the wireless transceiver 135. In some embodiments, the console generates a two-dimensional and/or three-dimensional mapping of the local area surrounding some or all of the HMD 100 based on information received from the HMD 100. In some embodiments, the console determines depth information for the three-dimensional mapping of the local area based on information received from the camera assembly 130 that is relevant for techniques used in computing depth. The HMD 100 may provide to the console, e.g., via the wireless transceiver 135, position information, acceleration information, velocity information, predicted future positions, or some combination thereof, of the HMD 100. Based on the received information, the console determines content to provide to the HMD 100 for presentation to the user.

In one embodiment, the front rigid body 105 includes one or more electronic display elements (not shown in FIG. 1), one or more integrated eye tracking systems (e.g., one eye tracking system for each eye of a user wearing the HMD 100, not shown in FIG. 1) that estimate a position and angular orientation of the user's eyes, an Inertial Measurement Unit (IMU) (not shown in FIG. 1), one or more position sensors (not shown in FIG. 1), and a reference point (not shown in FIG. 1). The position sensors may be located within the IMU, and neither the IMU nor the position sensors are visible to a user of the HMD 100. The IMU is an electronic device that generates fast calibration data based on measurement signals received from one or more of the position sensors. A position sensor generates one or more measurement signals in response to motion of the HMD 100. Examples of position sensors include: one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof.

The one or more electronic display elements of the HMD 100 may be integrated into an electronic display (not shown in FIG. 1). The electronic display generates image light. In some embodiments, the electronic display includes an optical element that adjusts the focus of the generated image light. The electronic display displays images to the user in accordance with data received from a console (not shown in FIG. 1). In various embodiments, the electronic display may comprise a single electronic display or multiple electronic displays (e.g., a display for each eye of a user). Examples of the electronic display include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof. The electronic display may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display.

The HMD 100 may also include an optical assembly (not shown in FIG. 1). The optical assembly magnifies received light from the electronic display, corrects optical aberrations associated with the image light, and the corrected image light is presented to a user of the HMD 100. At least one optical element of the optical assembly may be an aperture, a Fresnel lens, a refractive lens, a reflective surface, a diffractive element, a waveguide, a filter, a reflective surface, a polarizing reflective surface, or any other suitable optical element that affects the image light emitted from the electronic display. Moreover, the optical assembly may include combinations of different optical elements. In some embodiments, one or more of the optical elements in the optical assembly may have one or more coatings, such as anti-reflective coatings, dichroic coatings, etc. Magnification of the image light by the optical assembly allows elements of the electronic display to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. In some embodiments, the optical assembly is designed so its effective focal length is larger than the spacing to the electronic display, which magnifies the image light projected by the electronic display. Additionally, in some embodiments, the amount of magnification may be adjusted by adding or removing optical elements.

FIG. 2A is a side view of the HMD 100 in FIG. 1 without the side cover 120, in accordance with one embodiment. The side cover 120 and the strap arm 120 is removed in FIG. 2A so that an audio output assembly 200, which forms the left side 140 of a housing of the front rigid body 105, can be illustrated. The audio output assembly 200 provides sound to the left ear of a user wearing the HMD 100, and also provides a mechanical mounting structure for the strap arm 120 (not shown in FIG. 2A for the left side 140). The right side 145 of the front rigid body 105 may also include an audio output assembly that provides sound to right ear of the user wearing the HMD 100, and provides a mechanical mounting structure for the strap arm 150 at the right side 145.

Among other components, the audio output assembly 200 includes a sound conduit 205 that directs sound generated from within the audio output assembly 200 (e.g., by a speaker) toward the ear of the user. To direct the sound toward the ear of the user, the sound conduit 205 extends in a rear direction x of the HMD 100.

The HMD 100 further includes a facial interface 210. The facial interface 210 may be a compressible material mounted at the rear portion (e.g., opposite the front cover 115) of the front rigid body 105. When the HMD 100 is worn by a user, the facial interface 210 contacts the user's face, and can compress to provide a secure and comfortable fit for the HMD 100. Although there may be other components between the front rigid body and the facial interface 210, these components are omitted herein for the sake of convenience.

In some embodiments, the HMD 100 includes a battery 220 positioned at a top region of the front rigid body 105. The battery may be positioned in a cavity that opens from the top side of the front rigid body 105 between the left and right audio output assemblies 200. The speakers and other electrical components of the HMD are connected to the battery to receive power.

Figure 2B:
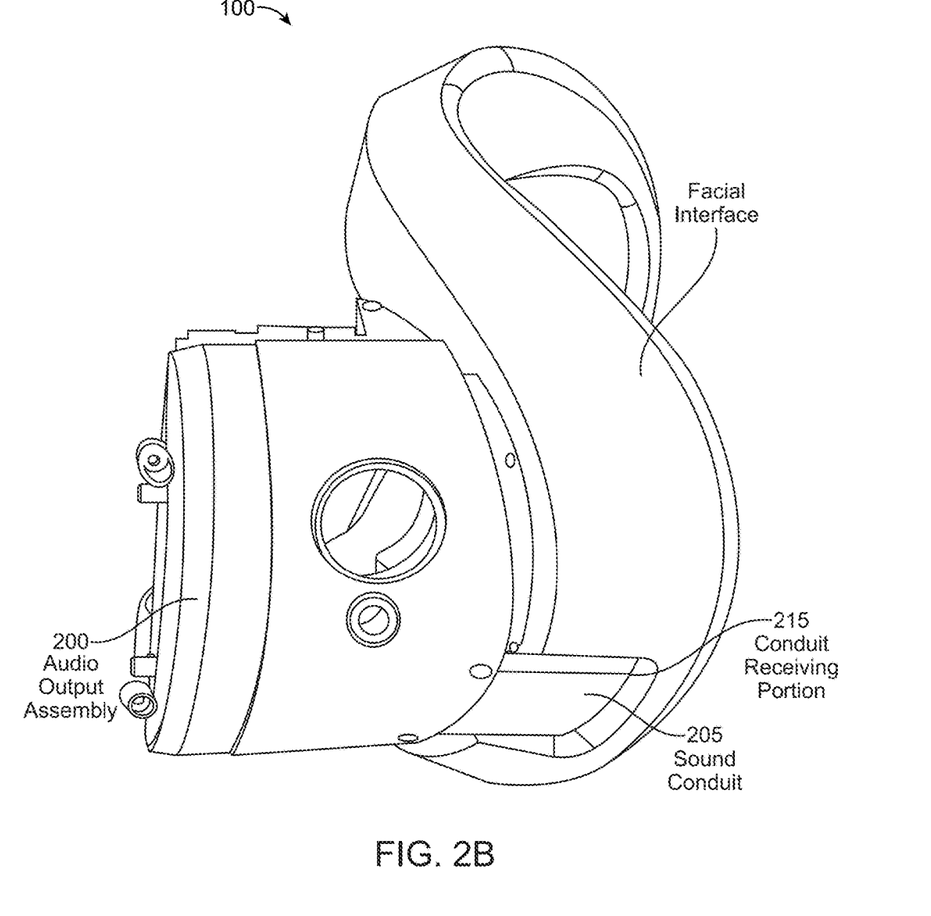
FIG. 2B is another side view of the HMD in FIG. 1 without the side cover 120, in accordance with one embodiment.

FIG. 2B is another side view of the HMD 100 having the facial interface 210 mounted to the audio output assembly 200, in accordance with one embodiment. The facial interface 210 may include a conduit receiving portion 215 for receiving the end portion of the sound conduit 205 that extends from the front rigid body 105. In some embodiments, the facial interface 210 has a first recess and second recess (as shown in FIG. 2B) defining respective conduit receiving portions 215 for the left and right sound conduits 205. When the sound conduit 205 is received by the facial interface 210, the facial interface 210 provides structural protection for the sound conduit 205 by mechanically shielding the inner side of the sound conduit 205 from the face of the user or other sources of direct contact. Furthermore, the sound conduit 205 may transmit sound to the facial interface 210. In some embodiments, the side cover 120 (shown in FIG. 1) may fit over the audio output assembly 200, shielding the outer side of the portion of the sound conduit 205 that extends from the front rigid body 105, where the outer side is defined opposite the inner side of the sound conduit 205 positioned within the recess 215 of the facial interface 210. As such, the facial interface 210 and side cover 120 collectively form a protection for the portion of the sound conduit 205 that extends from the front rigid body 105.

Figure 3:
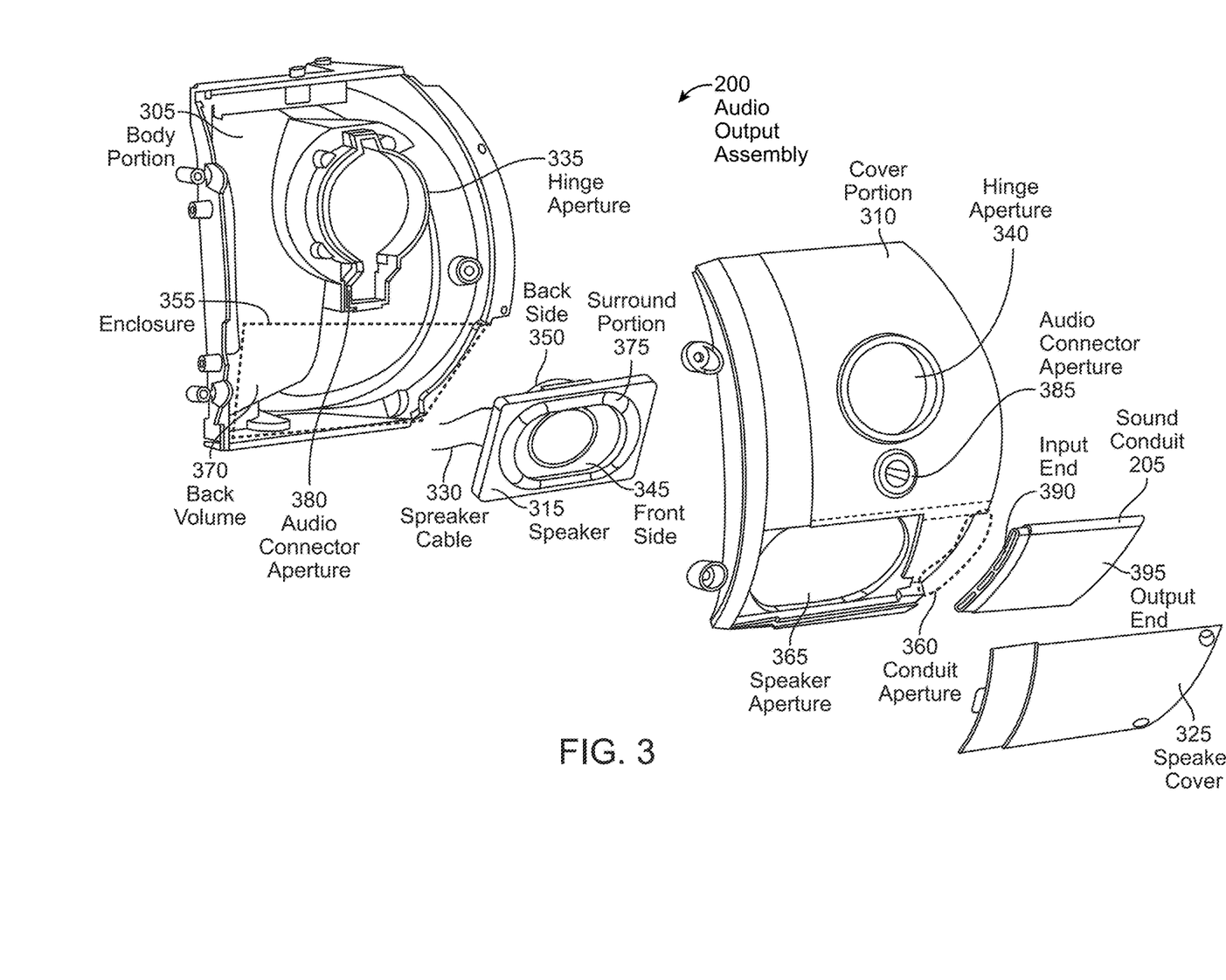
FIG. 3 is an exploded view of components of the audio output assembly, in accordance with one embodiment.

FIG. 3 is a perspective view of components of the audio output assembly 200, in accordance with one embodiment. The audio output assembly 200 includes a body portion 305, a cover portion 310, and a speaker cover 325 that collectively define a multi-part housing portion of the front rigid body 105. The audio output assembly 200 further includes a speaker 315 and the sound conduit 205. In some embodiments, an audio output assembly 200 forms the left side 140 of the of the front rigid body 105, and another audio output assembly 200 forms the right side 145 of the front rigid body 105. In some embodiments, the left and right audio output assemblies may include different components. In one example, only one of the audio output assemblies includes an audio connector to interface with an external speaker.

The body portion 305 provides a structural support to attach the audio output assembly 200 to the other components of the HMD 100. The cover portion 310 mounts to the body portion 305, such as via mechanical attachment (e.g., screws), adhesive, etc. In some embodiments, the cover portion 310 includes a separate speaker cover 325 that mounts to the cover portion 310 to cover a speaker aperture 365 of the cover portion 310.

The body portion 305, cover portion 310, and speaker cover 325 join to form a housing for the speaker 315 and an input end 390 of the sound conduit 205. In particular, the body portion 305, cover portion 310, and speaker cover 325 collectively form the housing defining an enclosure 355 for the speaker 316 and the input end 390. The enclosure 355 has a conduit aperture 360 defined by the cover portion 310 to form the conduit aperture 360 when the body portion 305 and cover portion 310 are joined.

The speaker 315 generates sound based on signals received through the speaker cable 330. The speaker 315 has a front side 345 and a back side 350. In some embodiments, the speaker 315 includes a diaphragm that generates sound which is emitted from the front side 345 and the back side 350. The back side 350 of the speaker 315 is placed within the enclosure 355 facing an interior surface of the body portion 305 such that a back volume 370 is defined between a portion of the housing (e.g., the body portion 305) and the back side 350 of the speaker 315. The back volume 370 enhances sound generated by the speaker 315. For example, the back volume 370 is acoustically coupled to the back side 350 of the speaker 315 to project the sound emitted from the back side 345 of the speaker 315 through into the input end 390 of the sound conduit 205. The sound conduit 205 transmits the sound through the sound conduit 205 and out of an output end 395 of the sound conduit 205.

In some embodiments, the cover portion 310 includes a speaker aperture 365 positioned over the front side 345 of the speaker 315 when the cover portion 310 is joined to the body portion 305. The speaker cover 325 is mounted over the speaker aperture 365 and covers the front side 345 of the speaker 315 within the enclosure 355. In some embodiments, the front side 345 of the speaker 315 has a protruding surround portion 375 (e.g., defined along the periphery of the diaphragm), and the speaker aperture 365 is fit to the size of the surround portion 375. The surround portion 375 extends into the speaker aperture 365 to position the speaker 314, and secure the speaker 315 in place within the enclosure 355.

The sound conduit 205 transmits sound generated by the speaker 315. The input end 390 of the sound conduit 205 is placed within the enclosure 355 with the speaker 315, and the output end 395 of the sound conduit 205 extends through the conduit aperture 360 (formed when speaker cover 325 is joined with the cover portion 310) out of the enclosure 355. The input end 390 of the sound conduit 205 positioned within the enclosure 355 acoustically couples to the sound within the enclosure 355, which is transmitted out of the enclosure 355 through the output end 395 of the sound conduit 205. The sound conduit 205 includes pathways extending between the input end 390 and the output end 395 to transmit sound and includes supporting ribs between the pathways for providing structural strength to the sound conduit 205.

In some embodiments, the body portion 305 includes a hinge aperture 335, and the cover portion 310 includes a corresponding hinge aperture 350. When the body portion 305 and cover portion 310 are joined, the hinge apertures 335 and 350 align to receive the strap arm 120.

In some embodiments, the body portion 305 includes an audio connector aperture 380, and the cover portion 310 includes a corresponding audio connector aperture 385. When the body portion 305 and cover portion 310 are joined, the audio connector apertures 380 and 385 are aligned to receive an audio connector for an external speaker.

Figure 4:
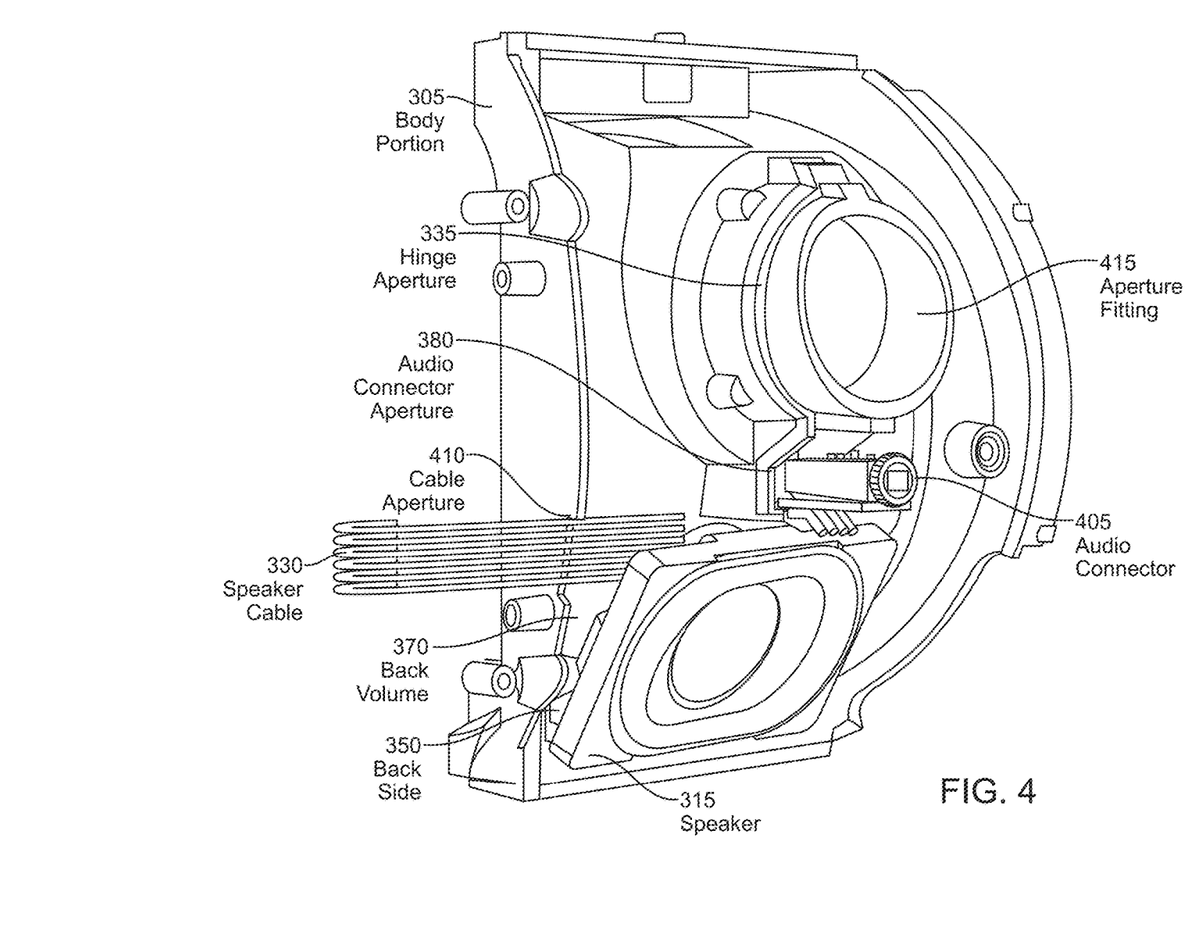
FIG. 4 is a perspective view of a speaker mounted within a body portion of the audio output assembly, in accordance with one embodiment.

FIG. 4 is a perspective view of the speaker 315 mounted within the body portion 305 of the audio output assembly 200, in accordance with one embodiment. Prior to the cover portion 310 being joined with the body portion 305, the speaker 315 is positioned within the body portion 305 with the back side 350 of the speaker 315 facing a portion of the body portion 305 to define the back volume 370.

An audio connector 405 extends through the audio connector aperture 380 of the body portion 305. The audio connector 405 provides audio output when an external speaker, such as on a headphone, loudspeakers, etc., is connected to the audio connector 405. The speaker cable 330 of the speaker 315 may also extend out from the body portion 305, such as at a cable aperture 415 defined by the body portion 305. The audio connector 405 and speaker cable 330 may be connected to a common source, such as a printed circuit board (PCB), controller, or other circuitry (e.g., positioned on the side body portion 305 opposite the speaker 315) that selectively routes an audio output signal. In some embodiments, the circuitry routes the audio output signal to the audio connector 405 when an external speaker is connected to the audio connector 405, and otherwise routes the audio output signal to the speaker 315. In some embodiments, the circuitry includes a central processing unit (CPU) that performs computation operations in the HMD 100, such as generating the audio output signal. In another example, a separate console or other computing device generates the audio output signal and provides the audio output signal to the HMD 100 using a wired or wireless connection.

In some embodiments, an aperture fitting 415 secures the body portion 305 with the cover portion 310 and facilitates their alignment. The aperture fitting 415 has a cylindrical shape, with a first side of the aperture fitting 415 positioned within the hinge aperture 335, and a second side of the aperture fitting 415 positioned within the hinge aperture 340 of the cover portion 310. The aperture fitting 415 thus facilitates alignment of the body portion 305 and cover portion 310 along the hinge apertures 335 and 340.

Figure 5:
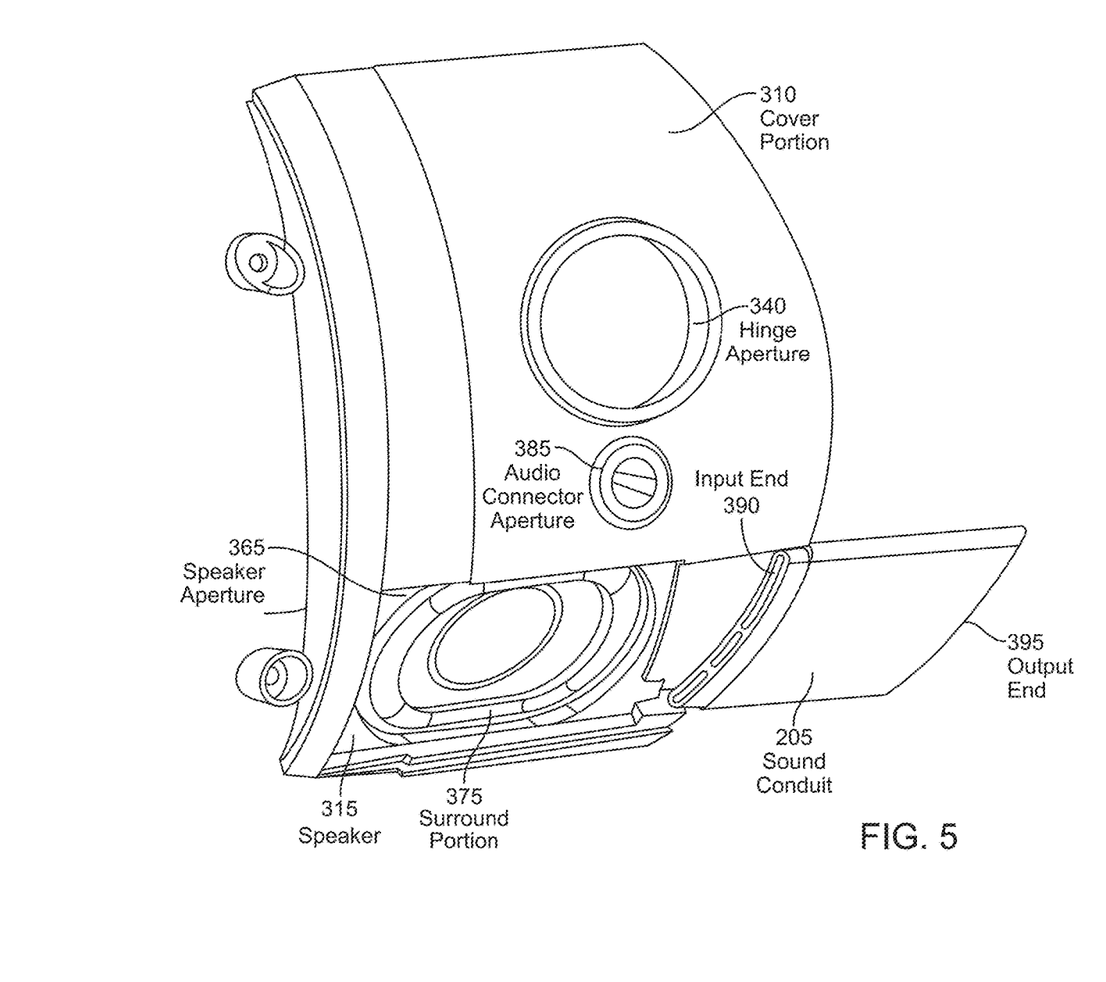
FIG. 5 is a perspective view of a sound conduit mounted on a cover portion of the audio output assembly, in accordance with one embodiment.

FIG. 5 is perspective view of the sound conduit 205 mounted on a cover portion 310 of the audio output assembly 200, in accordance with one embodiment. The input end 390 of the sound conduit is positioned on the cover portion 310. The speaker 315 is positioned with the surround portion 375 extending through the speaker aperture 365 when the cover portion 310 is joined to the body portion 305.

Figure 6:
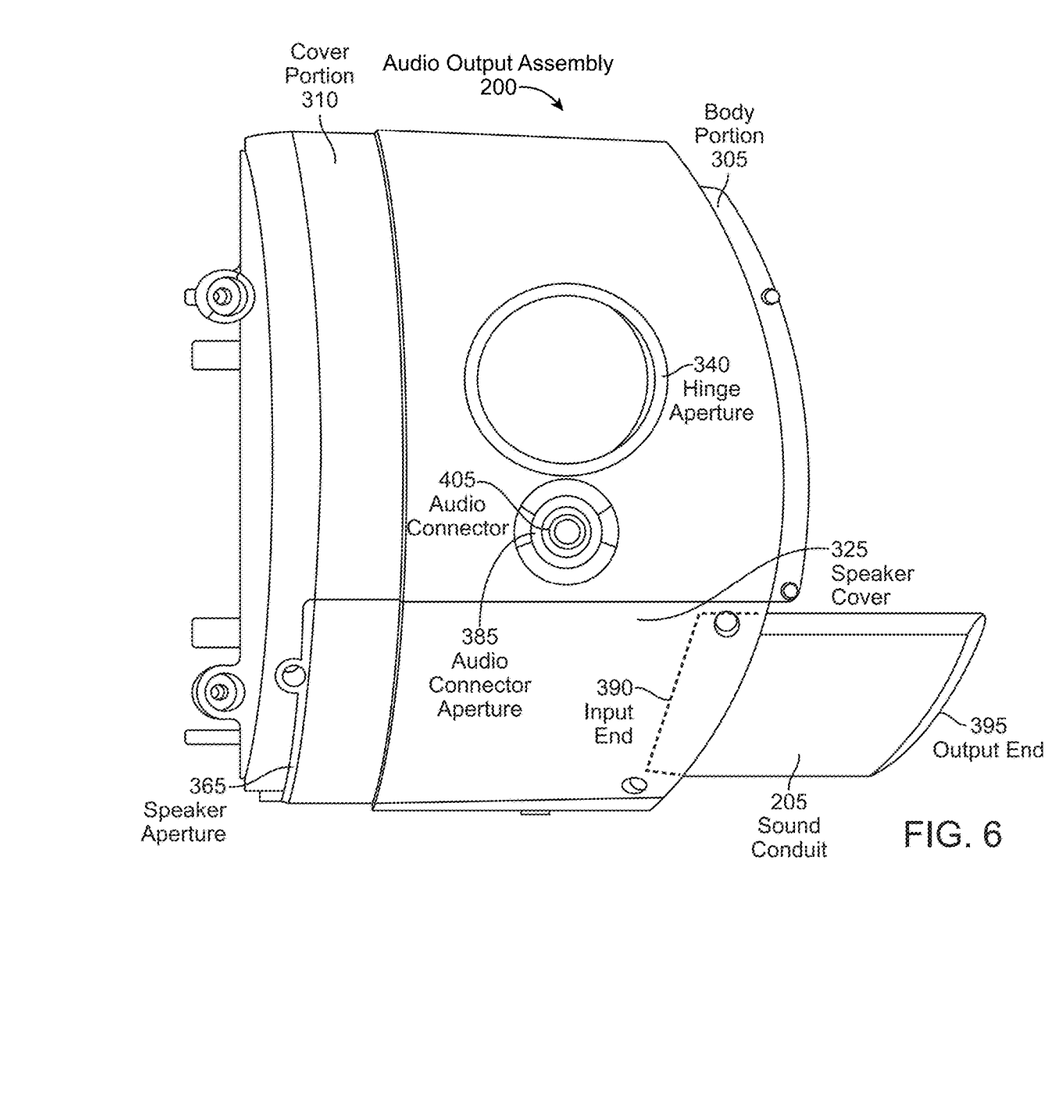
FIG. 6 is a perspective view of the audio output assembly including a cover portion joined with the body portion, in accordance with one embodiment.
Figure 7:
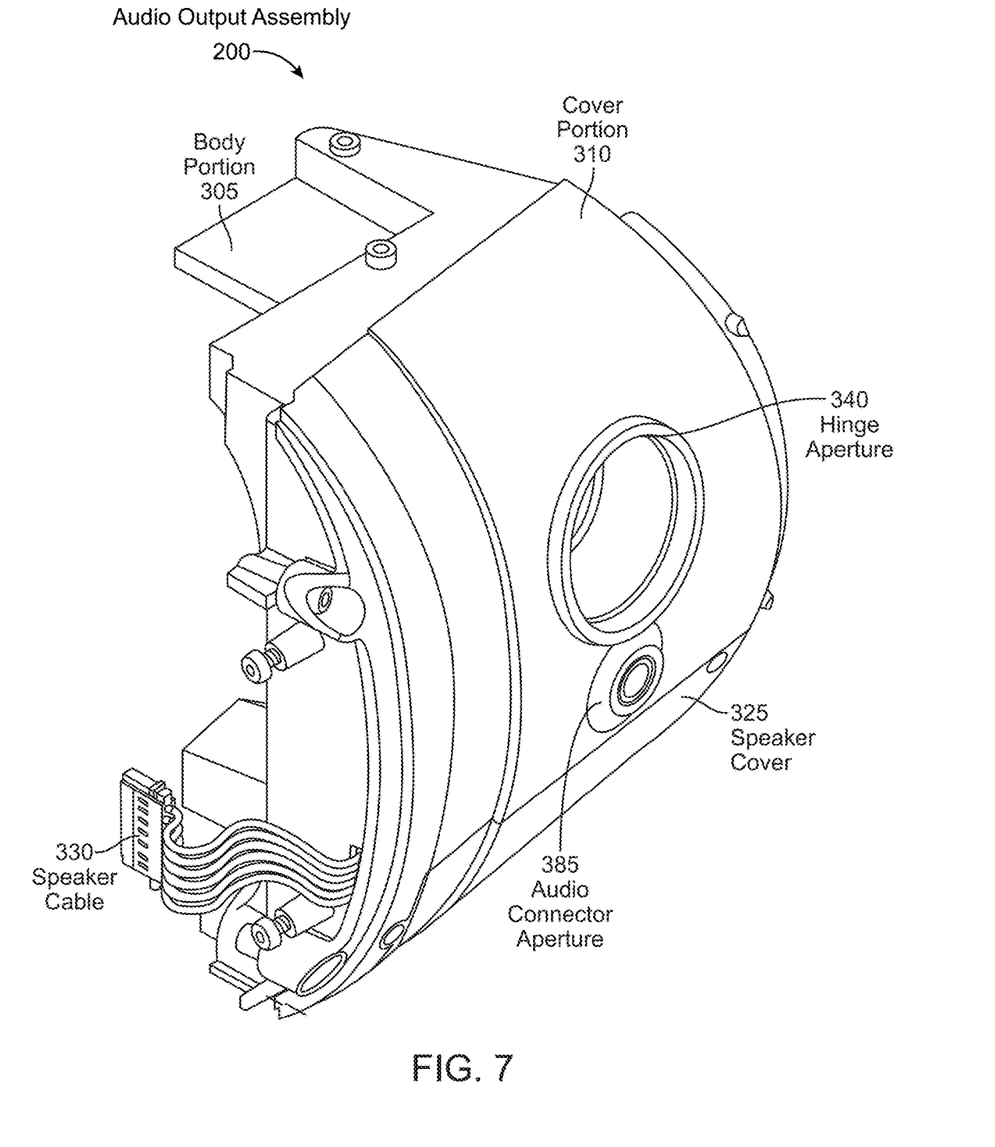
FIG. 7 is another perspective view of the audio output assembly, in accordance with one embodiment.

FIGS. 6 and 7 are two different perspective views of the audio output assembly 200 including the cover portion 310 joined with the body portion 305, in accordance with one embodiment. After the speaker 315 is positioned in the body portion 305 as shown in FIG. 4, the cover portion 310 is joined with body portion 310. The input end 390 of the sound conduit 205 is placed on the cover portion 310 as shown in FIG. 5, and then the speaker cover 325 is mounted to the cover portion 310 to form the enclosure 355 and the conduit aperture 360.

A hinge of the strap arm 120 may be inserted into the hinge apertures 340 and 335 to connect the strap arm 120 to the audio output assembly 200. The audio connector 405 extends through the audio connector aperture 385 of the cover portion 310.

The body portion 305, cover portion 310, and speaker cover 325 collectively form a multi-part housing portion of the front rigid body 105 to facilitate efficient assembly of the audio output assembly 200. For example, the speaker cover 325 can be removed from the cover portion 310 to access the enclosure 355, replace and/or repair the speaker 315 or the sound conduit 205 within the enclosure 355, etc. In some embodiments, two or more of the body portion 305, cover portion 310, and speaker cover 325 are integrated as a single piece portion.

The language used in the specification has been principally selected for readability and instructional purposes, and it may not have been selected to delineate or circumscribe the inventive subject matter. It is therefore intended that the scope of the disclosure be limited not by this detailed description. Accordingly, the disclosure of the embodiments is intended to be illustrative, but not limiting, of the scope of the disclosure, which is set forth in the following claims.

What is claimed is:

1. A head-mounted display (HMD), comprising:
a housing defining an enclosure having an aperture;
a speaker positioned within the enclosure, the speaker having a back side facing an interior surface of the housing and a front side facing away from the interior surface of the housing, a back volume defined between at least a portion of the housing and the back side of the speaker for enhancing sound generated by the speaker; and
a sound conduit having an end open to the enclosure and extending outside the housing through the aperture, the sound conduit having another end open toward a rear direction to transmit the sound generated by the speaker.

2. The HMD of claim 1, wherein the housing includes a body portion and a cover portion mounted to the body portion, the body portion defining the back volume and the cover portion defining the aperture.

3. The HMD of claim 2, wherein:
the cover portion is formed with another aperture for receiving at least a portion of the front side of the speaker; and
the housing further includes a speaker cover mounted to the cover portion to cover the speaker within the other aperture.

4. The HMD of claim 3, wherein the aperture is defined between the speaker cover and the cover portion.

5. The HMD of claim 3, wherein the body portion, the cover portion, and the speaker cover collectively define the enclosure.

6. The HMD of claim 1, wherein the housing is formed with a hinge aperture for receiving a hinge of a strap arm to attach the strap arm to the housing.

7. The HMD of claim 1, further comprising:
an audio output connector; and
a circuitry configured to route an audio signal to the audio output connector or the speaker driver, wherein the housing further includes an audio connector aperture for the audio connector.

8. The HMD of claim 1, further comprising a facial interface at a rear portion of the HMD, the other end of the sound conduit received in the facial interface.

9. The HMD of claim 1, wherein the sound conduit transmits the sound generated by the speaker to from the enclosure to the facial interface.

10. The HMD of claim 1, further comprising a battery located at a top region of the housing.

11. A head-mounted display (HMD), comprising:
a front rigid body defining an enclosure having an aperture; and
a sound conduit having an end open to the enclosure and extending outside the front rigid body through the aperture, the sound conduit having another end open toward a rear direction to transmit sound from the enclosure.

12. The HMD of claim 11, wherein:
the front rigid body includes a body portion and a cover portion mounted to the body portion, the body portion defining a back volume and the cover portion defining the aperture; and
the HMD further includes a speaker positioned within the enclosure, the speaker having a back side facing an interior surface of the front rigid body and a front side facing away from the interior surface of the front rigid body, a back volume defined between at least a portion of the housing and the back side of the speaker for enhancing sound generated by the speaker.

13. The HMD of claim 12, wherein:
the front rigid body is formed with another aperture for receiving at least a portion of the front side of the speaker; and
the front rigid body further includes a speaker cover mounted to cover the speaker within the other aperture.

14. The HMD of claim 13, wherein the aperture is defined between the speaker cover and the cover portion.

15. The HMD of claim 11, wherein front rigid body is formed with a hinge aperture for receiving a hinge of a strap arm to attach the strap arm to the housing.

16. The HMD of claim 11, further comprising:
an audio output connector; and a circuitry configured to route an audio signal to the audio output connector or the speaker driver, wherein the housing further includes an audio connector aperture for the audio connector.

17. The HMD of claim 11, further comprising a facial interface at a rear portion of the front rigid body, the other end of the sound conduit received in the facial interface.

18. The HMD of claim 11, wherein the sound conduit transmits the sound generated by the speaker to from the enclosure to the facial interface.

19. A method of manufacturing a head-mounted display (HMD), comprising:
- forming, with one or more housing portions, a housing defining an enclosure having an aperture;
- positioning a speaker within the enclosure, the speaker having a back side facing an interior surface of the housing and a front side facing away from the interior surface of the housing, a back volume defined between at least a portion of the housing and the back side of the speaker for enhancing sound generated by the speaker; and
- positioning an end of a sound conduit within the enclosure, the sound conduit having an end open to the enclosure and extending outside the housing through the aperture, the sound conduit having another end open toward a rear direction to transmit the sound generated by the speaker.

20. The method of claim 19, wherein the housing is formed with at least one of:
- a hinge aperture for receiving a hinge of a strap arm to attach the strap arm to the housing; or
- an audio connector aperture for the audio connector.

\* \* \* \* \*

UNITED STATES PATENT AND TRADEMARK OFFICE
CERTIFICATE OF CORRECTION

| | | |
|---|---|---|
| PATENT NO. | : 10,178,457 B1 | Page 1 of 1 |
| APPLICATION NO. | : 15/668610 | |
| DATED | : January 8, 2019 | |
| INVENTOR(S) | : David Tao et al. | |

It is certified that error appears in the above-identified patent and that said Letters Patent is hereby corrected as shown below:

On the Title Page (57) Abstract, Line 2, delete "A is speaker" and insert -- A speaker --

In the Claims

Column 9, Claim 18, Line 2, delete "the speaker to from the enclosure" and insert -- the speaker from the enclosure --

Signed and Sealed this
Twenty-fifth Day of June, 2019

Andrei Iancu
*Director of the United States Patent and Trademark Office*